United States Patent
Guillou et al.

(10) Patent No.: US 6,551,428 B1
(45) Date of Patent: Apr. 22, 2003

(54) PROCESS FOR ASSEMBLY OF A FLEXIBLE PANEL ON AN OPEN STRUCTURE AND INSTALLATION FOR USE OF THIS PROCESS

(75) Inventors: Jean-Noël Guillou, Verton (FR); André Gregoire, Antheit (BE)

(73) Assignee: Sonaca S.A., Gosselies (BE)

( * ) Notice: Subject to any disclaimer, the term of this patent is extended or adjusted under 35 U.S.C. 154(b) by 151 days.

(21) Appl. No.: 09/610,925

(22) Filed: Jul. 6, 2000

(30) Foreign Application Priority Data

Jul. 9, 1999 (BE) .............................. 09900474

(51) Int. Cl.⁷ .................. B32B 31/00; B32B 35/00; B32B 7/08; C09J 5/00
(52) U.S. Cl. .................. 156/91; 156/152; 156/214; 156/312; 156/391; 156/477.1
(58) Field of Search .................. 29/429, 430, 431, 29/432.1, 446, 448, 458, 464, 467, 469.5, 525.02, 525.06, 559, 564.2, 56.6, 791, 795, 796, 816, 818, 238, 281.3, 281.5, 281.6, 283.5, 904; 156/91, 92, 152, 160, 196, 201, 214, 221, 228, 285, 286, 290, 307.3, 307.7, 391, 356, 574, 580; 269/22, 37, 41, 43, 54.5, 55, 58, 87, 91, 154, 287, 309

(56) References Cited

U.S. PATENT DOCUMENTS

| 3,376,184 A | * | 4/1968 | Ritchey et al. ............. 100/211 |
| 3,616,075 A | | 10/1971 | Jarvis et al. |
| 4,595,444 A | | 6/1986 | Legge et al. |
| 4,783,228 A | | 11/1988 | Aker et al. |
| 4,894,903 A | | 1/1990 | Woods |
| 5,552,095 A | * | 9/1996 | Merser et al. ............. 156/285 |

FOREIGN PATENT DOCUMENTS

| FR | 2 554 878 | 5/1985 |
| FR | 2 611 552 | 9/1988 |

* cited by examiner

Primary Examiner—Richard Crispino
Assistant Examiner—Sing P Chan
(74) Attorney, Agent, or Firm—Pearne & Gordon LLP

(57) ABSTRACT

Process for assembly of a flexible panel on an open structure, and installation to make use of this process. According to the invention, a flexible panel (12) is attached to an open structure (10) by pre-assembling these two parts by cold gluing before they are fixed using attachment devices such as rivets. Cold gluing is done using a gluing cap (48) on the inside of which linear and individual inflatable joints (54, 56) are fitted to press the panel (12) into contact with the framework (10) in unperforated parts of the framework. The time necessary for assembly is thus very much reduced, while the quality of part positioning is unaffected.

14 Claims, 9 Drawing Sheets

PROCESS FOR ASSEMBLY OF A FLEXIBLE PANEL ON AN OPEN STRUCTURE AND INSTALLATION FOR USE OF THIS PROCESS

TECHNICAL FIELD

The invention relates to a process for assembling a flexible panel on an open, elastically deformable structure and with greater stiffness than the panel. More precisely, the invention relates to a pre-assembly step during which the panel is put into position and is held on the structure before being permanently fixed to it by means of mechanical attachment devices such as rivets.

In the rest of this text, the expression "flexible panel" generally denotes any sheet metal element, plate, shell or coating, with a simple or complex structure made from a metallic or other material, and with an arbitrary shape, contour and dimensions.

Furthermore, the expression "open structure" denotes any discontinuous, simple or complex structure such as an angle, rail or rib, or a perforated framework formed from several previously assembled elements of this type.

The invention also relates to a pre-assembly installation for use of this process.

The process and the installation according to the invention have a preferred application in the aeronautical industry, and particularly in a flexible workshop for manufacturing aircraft assemblies or subassemblies such as leading edges, or more generally wing or fuselage elements.

STATE OF PRIOR ART

In the aeronautical industry, a flexible panel is usually attached to a stiffer structure by means of several mechanical attachment devices such as rivets or bolts that pass through the panel and the adjacent part of the structure that supports it. Therefore, with this assembly type, the panel and the adjacent part of the structure have to be drilled simultaneously at a large number of points before the attachment devices are put into position.

If the assembly is to be made satisfactorily, particularly concerning relative positioning of the panel and the structure, the normal procedure is to use a pre-assembly step before these parts are attached.

Normally, parts are pre-assembled using a "temporary fastening" technique. With this technique, reference support pins temporarily fix the panel to the open structure in order to achieve correct relative positioning of the two parts during their final attachment.

More precisely, with the temporary fastening technique, it is necessary to firstly make a number of manual preliminary drillings in the panel from the inside of the structure using pilot guide holes in the structure. The diameter of these drillings is less than the diameter of the drillings that will be made later for final attachment of the parts using mechanical attachment devices. The operator then gradually inserts the reference support pins. Counter drillings are then made from the outside at a diameter close to the final diameter, with gradual transfer from the reference support pins. The panel is then disassembled so that it can be trimmed and to remove the swarf. The operators then apply mastic to the structure, then reassemble the panel using pins until the mastic has polymerized.

In order to make the final assembly, the pins are disassembled individually. After each pin has been removed, the parts are drilled or bored to the final required diameter and the attachment device, usually consisting of a rivet, is inserted. The operator then works progressively until each pin has been replaced by a final attachment device.

This traditional assembly technique requires double drilling and several manipulations at each part attachment point. This can lead to assembly inaccuracies and in all cases, requires long working times. This disadvantage is particularly penalizing for a flexible workshop, in which the main objective is to reduce manufacturing costs and times.

Document WO 97/34734 proposes a technique for manufacturing aircraft assemblies or subassemblies such as wings. According to this technique, parts of the assembly to be made are manufactured by numerically controlled machine tools that also make presentation drillings at precise locations in these parts. During the subsequent assembly of the different parts, these drillings are used to directly attach them using traditional attachment devices without any pre-assembly being necessary.

This technique is theoretically attractive, but there are many difficulties with it in practice.

Thus, the predicted assembly precision is only obtained if the presentation drillings made in each part are actually at the required locations. This constraint is difficult to satisfy for parts with complex and relatively flexible parts, which is the case particularly for panels forming skins of wings.

Furthermore, even if this technique eliminates the pre-assembly operation, it is still expensive and takes a relatively long time to implement.

Document FR-A-2 554 878 also describes a known installation and a known process for fixing a metallic skin onto a framework in order to make an aircraft wing. The technique proposed in this document also eliminates all pre-assembly operations.

In this case, the metallic skin is fixed to the framework by hot gluing. This is done by the use of one or several pressurization chambers in a furnace, and an assembly including the framework, the skin and a sealed bag surrounding each part are placed in each pressurization chamber. Rigid plates are placed between the bag and the metallic skin facing the perforated parts in the framework in order to prevent deformation of the skin adjacent to these perforated parts when the intermediate space between the bag and the chamber is pressurized. These rigid plates are supported by a flexible sheet.

This process is not suitable in many cases. Hot gluing requires that a high pressure is applied. When the framework to which the skin is to be fixed is not perfectly rigid, as is almost always the case in the aeronautical industry, application of a pressure in this way would result in unacceptable permanent deformations. This constraint is particularly important when the assembly to be made is not a closed assembly, which is the case particularly for the leading edge of a wing.

Another disadvantage of this technique is that it is very difficult to apply. The relative positioning of the skin and the framework makes it necessary to use guide pins between these two parts and to create a partial vacuum inside the assembly before pressure is applied in the chamber. The positioning of rigid plates facing perforated regions of the framework raises similar difficulties. Therefore, there are good chances that the assembly thus made will not have the required characteristics. This is obviously unacceptable, considering the cost of the assemblies and subassemblies used in the manufacture of an aircraft.

DESCRIPTION OF THE INVENTION

The purpose of the invention is a process for the innovative assembly of a flexible panel on a more rigid structure in order to make pre-assembly of these parts in a much faster manner than is possible using traditional stapling techniques, while enabling an equally precise positioning of parts.

The invention proposes a process for assembly of a flexible panel on an open, elastically deformable structure that is stiffer than the panel consisting of a number of steps in sequence, namely pre-assembly and then attachment of the panel onto the structure using mechanical attachment devices, characterized in that the pre-assembly is done by cold gluing.

The expression "cold gluing" as used herein consists of any gluing at essentially ambient temperature and at relatively low pressure compared with the high pressure necessary for hot gluing.

Use of the cold gluing technique for pre-assembly an partly automate this operation and integrate it into a flexible workshop. This operation is about ten times faster than the traditional temporary fastening technique.

Furthermore, cold gluing requires that parts are pressed into contact with each other with a relatively low tightening force. Therefore, there is no risk of permanent deformation of the structure to which the panel is fixed, even it is not a closed structure as in the case of the leading edge of an aircraft wing.

In a preferred embodiment of the invention, cold gluing is done by assembling the structure onto a rigid chassis, by positioning the panel on the structure with insertion of glue and pressing the panel into contact with the structure.

If the structure onto which the panel is to be fixed is a perforated framework, the panel is locally pressed into contact with this framework, mainly in unperforated regions of the framework.

More precisely, when the perforated framework comprises essentially C-shaped ribs and devices forming stiffeners connecting these ribs together, the panel is pressed into contact with these devices over most of their length, and the panel is also pressed into contact with these ribs at local positions between devices forming stiffeners.

When the radius of curvature of the ribs is variable, with a minimum value in the central region, the panel is also pressed into contact with the central regions of the ribs over most of the length of the perforated framework.

Advantageously, the panel is progressively pressed into contact with the perforated framework, firstly by bringing the panels into contact with the said central regions of the ribs and then progressively working towards the rib end regions.

In the preferred embodiment of the invention, the panel is pressed into contact with the perforated structure by means of inflatable joints installed in a rigid gluing cap acting as a mating form.

Advantageously, the panel is then put into position on the chassis supporting the perforated framework without inserting glue, the cap is then moved into the gluing position to hold the panel in position, the cap supporting the panel is moved away from the framework, the glue is applied, and the cap is brought back into the gluing position to press the panel into contact with the framework.

Preferably, the cap is moved into the gluing position by guiding it onto the chassis supporting the framework.

Furthermore, in order to prevent any relative displacement between the cap and the chassis during gluing, it is advantageous to clamp the cap onto the chassis supporting the framework before pressing the panel into contact with the framework.

When the perforated framework comprises at least one overhanging edge, this edge is preferably held in place using thrust devices fitted on the gluing cap before locally pressing the panel into contact with the perforated framework.

In a flexible workshop, it is advantageous to install the structure on the rigid chassis at an assembly station for this structure by assembling its component elements on an assembly template fixed to a frame. The assembly template and the frame then form the rigid chassis. In this case, the rigid chassis supporting the structure is transferred to a gluing station, where the panel is glued to the structure.

The process according to the invention is advantageously applicable to the assembly of a skin forming the flexible panel on a framework forming the structure, when an aircraft leading edge is being manufactured.

The invention also relates to an installation for pre-assembly of a flexible panel on an open, elastically deformable structure with greater stiffness than the panel, before the panel is attached to the structure using mechanical attachment devices, characterized in that it comprises cold gluing means.

BRIEF DESCRIPTION OF THE DRAWINGS

We will now describe a preferred embodiment of the invention as a non-limitative example with reference to the attached drawings, in which.

DETAILED DESCRIPTION OF A PREFERRED EMBODIMENT OF THE INVENTION

Figure 1:
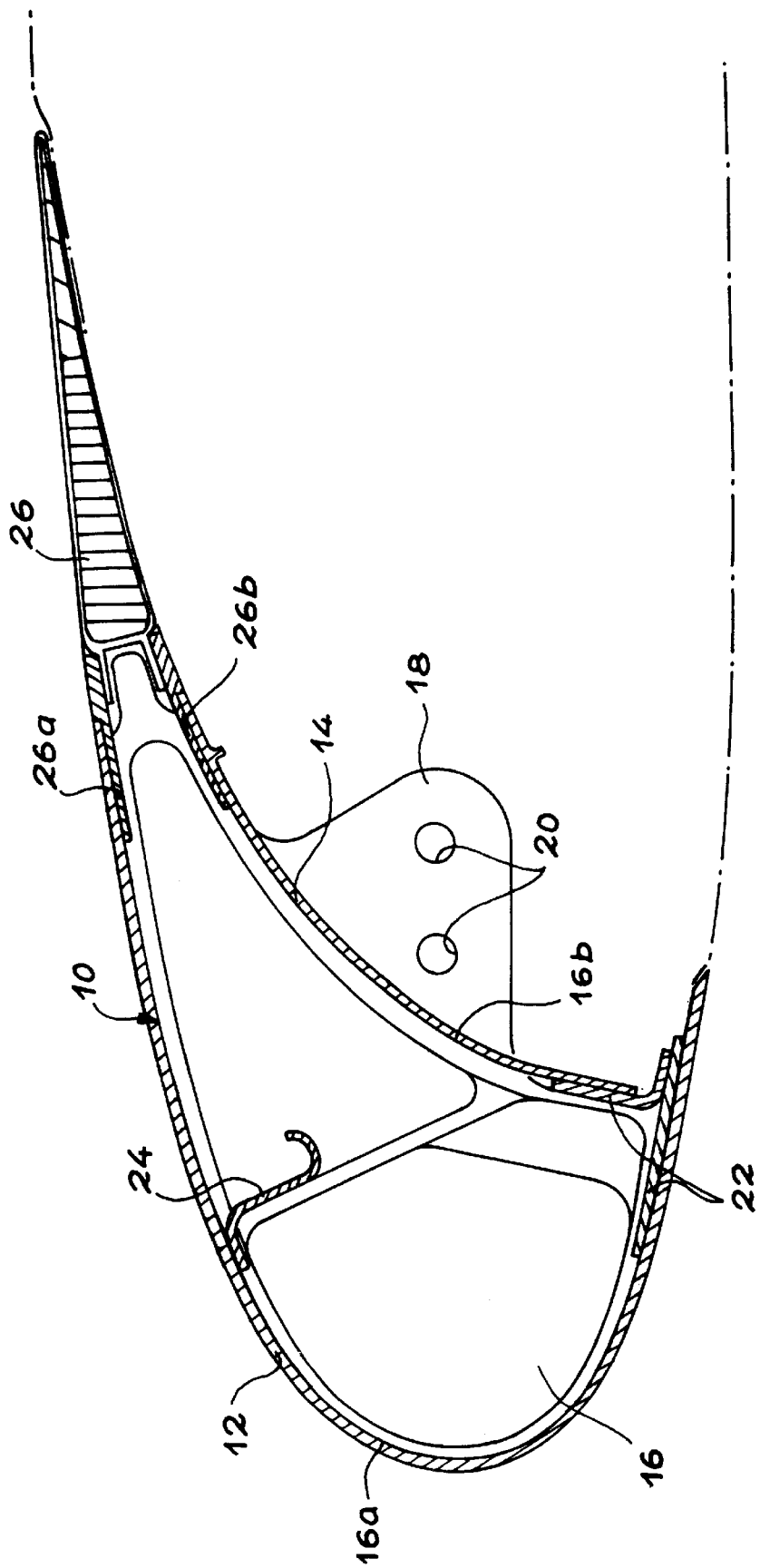
FIG. 1 is a cross-sectional view of a leading edge of an aircraft wing that could be manufactured using the assembly process according to the invention.

FIG. 1 shows a section through a leading edge of an aircraft wing that could be manufactured by the process and the installation according to the invention. As already mentioned, the invention is particularly suitable for manufacturing this type of subassembly. However it may be used in many other cases, for example to assemble an angle on a shell, to fix a rail on a skin, to fix a gusset or a reinforcing upright on a rib, and more generally to fix any flexible panel to a more complicated elastically deformable structure with greater stiffness than the panel, and particularly to make a fuselage or wing element.

The leading edge illustrated as an example in FIG. 1 comprises a perforated framework 10, an upper or outer skin 12 and a lower or inner skin 14.

The perforated structure 10 comprises a number of ribs 16 with a C or H shaped cross-section. The ribs 16 are usually metallic parts, for example made by machining, stamping, etc. Each of these ribs has an outer surface 16a on which the upper skin 12 is fixed, and an inner surface 16b on which the lower skin 14 is fixed. Some of the ribs 16 are also fitted with a clevis 18 on their inner surface 16b through which two holes 20 pass and that are used to connect the leading edge to the rest of the wing. The ribs 16 are usually arranged to be parallel to each other.

The perforated framework 10 also comprises two stiffeners 22 and 24 and a trailing edge 26 that also acts as a stiffener. The stiffeners 22 and 24 and the trailing edge 26 connect the ribs 16 to each other along a longitudinal direction essentially perpendicular to the planes of the ribs.

The stiffener 22, also called the lower stiffener, is located at the intrados junction between the outer surface 16a and the inner surface 16b of the ribs 16. The trailing edge 26 joins the outer surface 16a and the inner surface 16b of the ribs 16 at their extrados junction. Finally, the stiffener 24, called the upper stiffener, joins the outer surface 16a of ribs 16 in an extrados region intermediate between the trailing edge 26 and the front of the leading edge.

As shown in FIG. 1, the upper skin 12 is fixed to the perforated framework 10 along the outer surfaces 16a of ribs 16, and along stiffeners 22 and 24 and part of the front extrados 26a of the trailing edge 26.

Furthermore, the inner skin 14 is fixed to the inner surface 16b of each of the ribs 16, on the lower stiffener 22 and on part of the front intrados 26b of the trailing edge 26. This attachment is such that the clevises 18 project beyond the lower skin 14.

The installation that will now be described applies mainly to the attachment of the upper skin 12 to the perforated framework 10.

Figure 2:
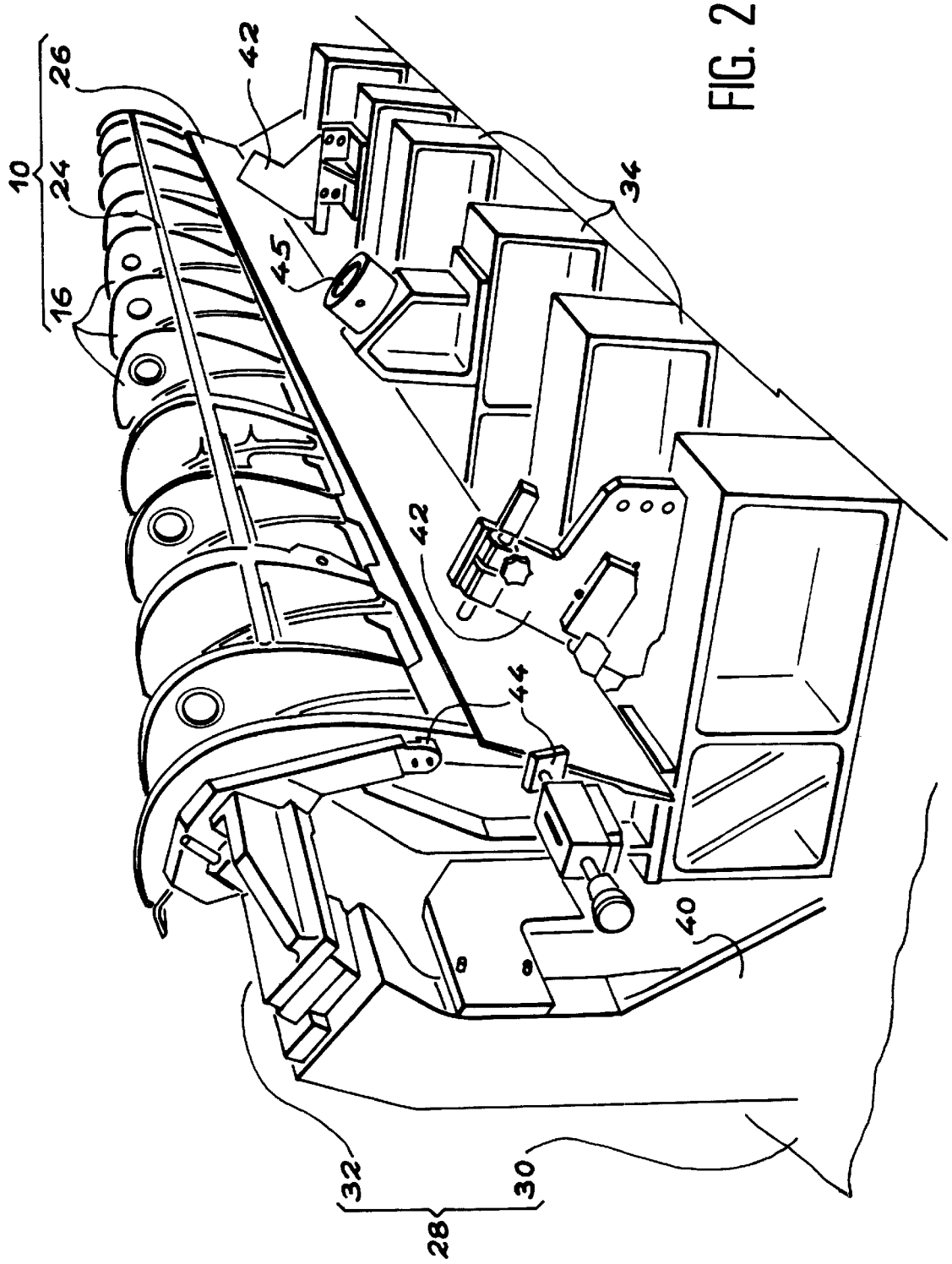
FIG. 2 is an overall perspective view showing part of the rigid chassis on which the perforated framework of the leading edge in FIG. 1 is assembled, before the flexible panel is attached to this structure.
Figure 3:
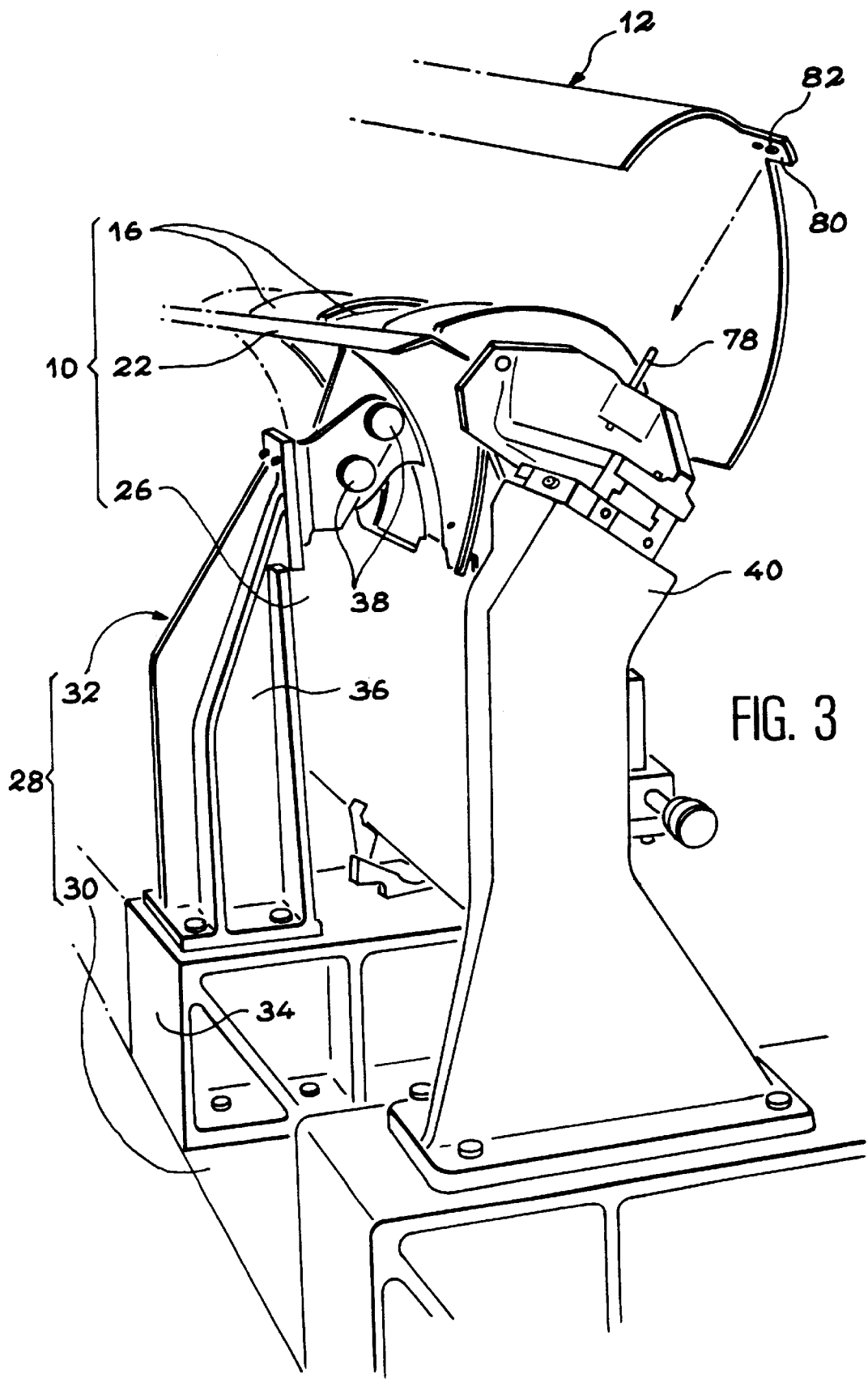
FIG. 3 is a perspective view on a larger scale, illustrating another part of the rigid chassis and the principle of positioning the panel on the framework supported by this chassis.

In FIGS. 2 and 3, reference 28 generally denotes the rigid chassis used for manufacturing the framework 10 and attachment of the upper skin 12 to the framework.

Consequently, the rigid chassis 28 comprises a frame 30 that can be transferred between an assembly station for the perforated framework 10 and a gluing station, in which the upper skin 12 is glued to the perforated framework 10 during a pre-assembly step specific to the process according to the invention. The frame 30 that is in the form of a rigid beam supports the perforated structure 10 through an assembly template 32. This template 32 and the frame form the rigid chassis 28.

The upper part of the frame 30 is fitted with anchor panels 34 onto which the different elements forming the assembly template 32 are fixed. In particular, these elements include the supports 36 that individually support the ribs 16 equipped with devises 18 through two pins 38 passing through the holes 20 formed in the clevis.

The two anchor panels 34 located at the ends of the frame 30 support two end supports 40 located beyond the ends of the perforated framework 10. More precisely, these end supports 40 support stops 44, preferably adjustable, used in particular to position the framework 10 accurately on the chassis 28.

As shown in particular in FIG. 2, some of the anchor panels 34 also support adjustable stops 42, with which the trailing edge 26 comes into contact. The end edges of the trailing edge 26 also come into contact with one of the adjustable stops 44 supported by each of the end supports 40.

Furthermore, one or two anchor panels 34 located between the end supports 40 are fitted with a centering sphere receptacle 45 (FIG. 2) on the same side of the framework 10 supporting the leading edge 26, and towards the outside of the leading edge. The function of this receptacle 45 will be described later. The same anchor panel 34 supports an anchor clevis 47 (FIG. 4) on the other side of the perforated framework 10, for a clamping stand 74 (FIG. 6), the function of which will be described later.

When the rigid chassis 28 is at the assembly station the perforated framework 10 is assembled by fixing the ribs 16 to the supports 36, by placing the trailing edge 26 in contact with the stops 42 and 44 and by assembling the stiffeners 22 and 24 at the positions that they will occupy in the framework. The attachment of the various parts does not form part of the invention. Parts are attached by conventional means, particularly using through attachment devices such as rivets. However, any other attachment mode could be envisaged without going outside the scope of the invention.

When the assembly of the perforated framework 10 is finished, the rigid chassis 28 supporting this framework is transported on the assembly station to the gluing station by appropriate transport means such as a mobile wire guide unit. However, any other transport means may be used (travelling crane or other) without going outside the scope of the invention.

When the rigid chassis supporting the perforated framework 10 reaches the gluing station, the frame 30 is put down on two centering stands 46 (FIGS. 4 and 5) placed on the floor. These stands 46 are laid out symmetrically on each side of a median plane perpendicular to the frame 30 in order to define an isostatic support that can easily be adjusted in height. They are equipped with means (not shown) of clamping the frame 30 in the horizontal position. They thus define a fixed reference for the rigid frame 28 at the gluing station.

Figure 4:
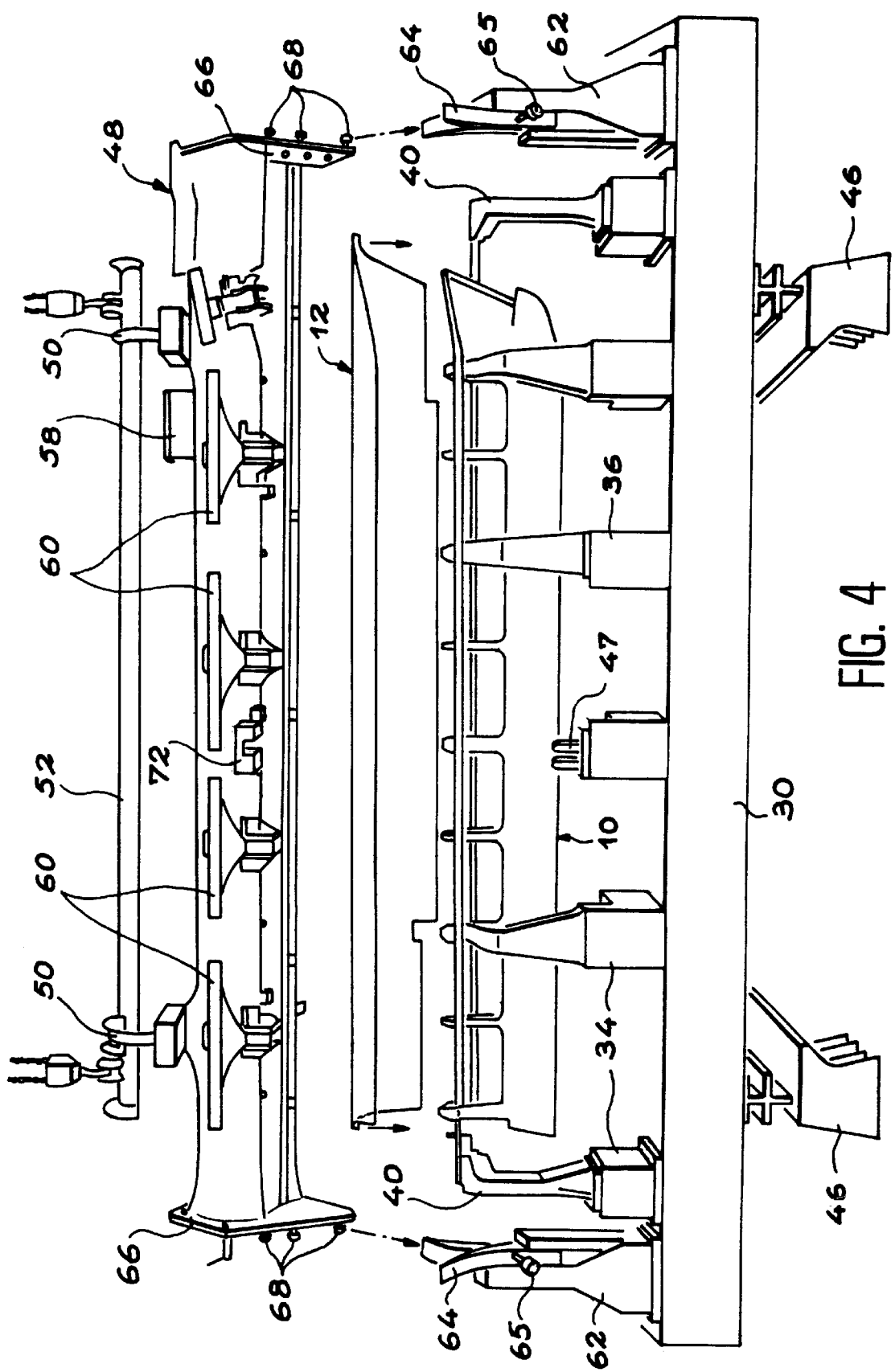
FIG. 4 is an overall perspective view showing the placement of a gluing cap on the parts to be assembled supported by the chassis.

As shown in FIG. 4, the installation according to the invention also comprises a rigid gluing cap generally denoted as reference 48. This cap 48 is equipped with means such as hooks 50 so that it can be moved between an active position in which gluing is possible and an inactive position in which the rigid chassis 28 can be moved and the cap can be stored. In the example embodiment shown, cap displacements may in particular be achieved by means of a portal frame (not shown) from which a horizontal bar 52 fitted with hooks 50 is suspended.

Note that gluing caps 48 with different shapes and/or dimensions may advantageously be provided when the installation is used on a flexible workshop for the manufacture of different types of leading edges.

The inside of the cap 48 is recessed 49 (FIG. 6) to a shape that is essentially complementary to the outside shape of the skin 12 to be fixed to the perforated framework 10. More precisely, there is a limited and essentially uniform clearance between the skin 12 and the recess 49 when the cap covers the parts to be assembled.

Figure 6:
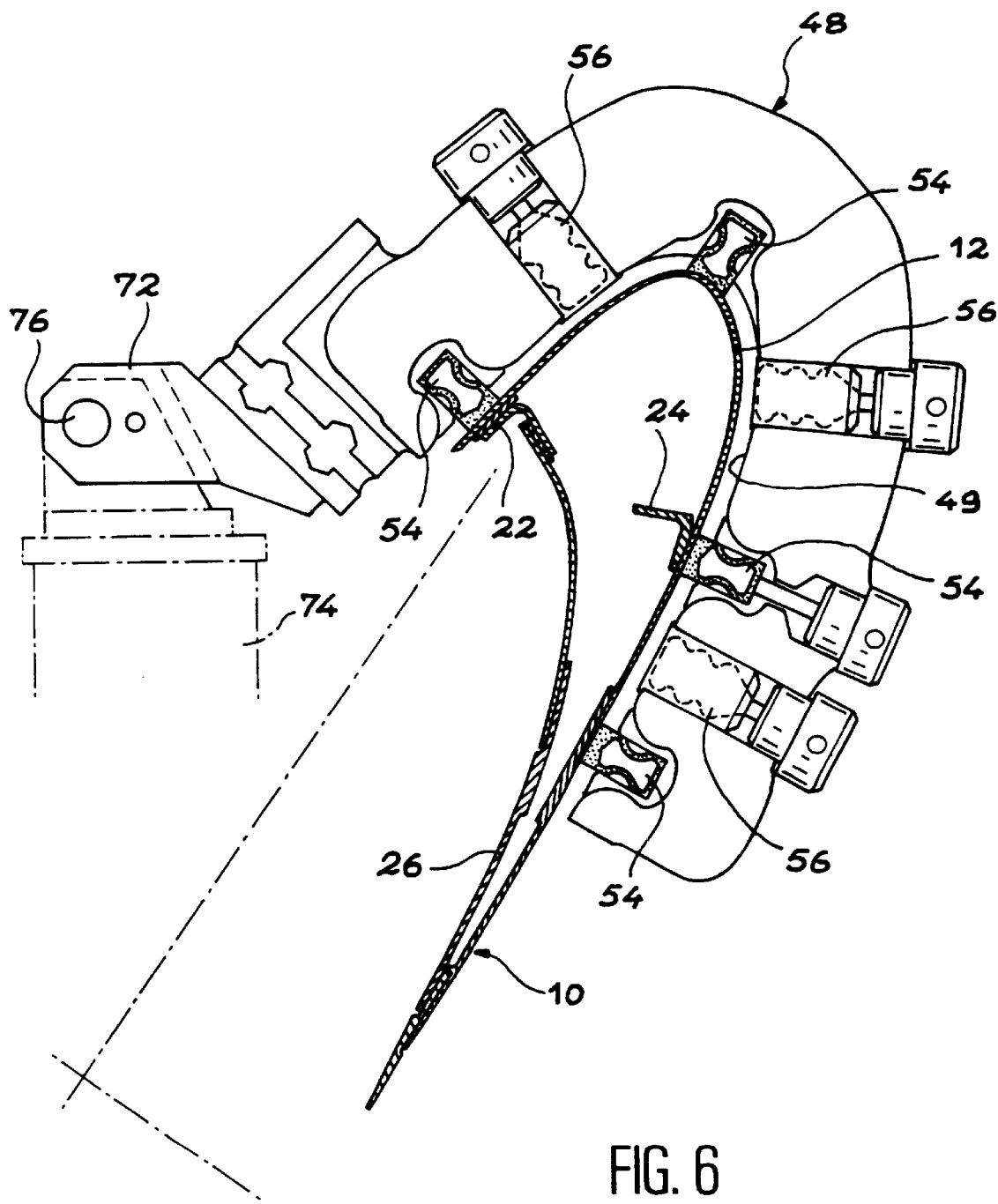
FIG. 6 is a sectional view of the gluing cap, showing in particular the inflatable joints installed on it.

Since the essential function of the gluing cap 48 is to press the skin 12 into contact with the perforated framework 10 with sufficient force to cold glue these two parts together without introducing any permanent deformation to framework 10, the cap is fitted with inflatable or deformable joints on the inside as shown in FIG. 6.

In the preferred embodiment shown illustrated, the inflatable joints fitted on the gluing cap 48 comprise four linear or longitudinal joints 54 and a plurality of local joints called "mushrooms" 56.

Two of the linear joints 54 are located above the stiffeners 22 and 24. A third linear joint 54 is located above the front extrados part 26a of the trailing edge 26. Finally, the fourth linear joint 54 is located above the front end of ribs 16, in other words in an essentially central part of these ribs inserted between stiffeners 22 and 24 and with the smallest radius of curvature.

Isolated inflatable joints 56 are located facing the ribs 16 so as to press the skin 12 into contact with the outside surfaces 16a of the ribs between the linear inflatable joints 54, in other words between stiffeners.

The inflatable joints 54 and 56 used on the gluing cap 48 are connected to a pneumatic distribution box 58 through separate pneumatic supply lines (not shown). The distribution box 58 may in particular be installed on the gluing cap 48 as shown in FIG. 4.

The pneumatic supply circuit comprising the distribution box 58 and the pneumatic supply lines is capable of pressurizing the inflatable joints 54 and 56 sequentially or progressively. In other words, when the circuit is activated, the inflatable joints 54 and 56 are pressurized progressively rather than simultaneously.

More precisely, in the embodiment described as an example with reference to FIG. 6, the upper skin 12 is pressurized progressively in five successive steps:

in the first step, the linear joint 54 located facing the front end of the leading edge 10 with the smallest radius of curvature is pressurized;

in a second step, the single-point joints 56 located between the previously pressurized linear joint 54 and the linear joints 54 located along stiffeners 22 and 24, are pressurized in turn;

in the next step, the two linear joints 54 facing stiffeners 22 and 24 are pressurized;

the fourth step consists of pressurizing single-point joints 56 inserted between the linear joints 54 located facing the upper stiffener 24 and the front extrados part 26a of the trailing edge;

finally, the linear joint 54 located facing the front extrados part 26a of the leading edge 26 is pressurized in turn.

When this gradual pressurization is terminated, all inflatable joints 54 and 56 are kept pressurized for sufficiently long to enable gluing of the upper skin 12 on the perforated framework 10.

The body of the cap 48 has a rigid structure onto which each of the inflatable joints 54 and 56 are pressed. Therefore when they are pressurized, these joints deform inwards into recess 49 in order to press the upper skin 12 in contact with the framework 10. The force thus generated is sufficient to cold glue these two parts, once a glue layer has been inserted. However, this force is too small to cause permanent deformations in the parts.

The glue used may consist of any glue capable of cold gluing the two parts at low pressure.

As a non-limitative illustration, the glue may be a mastic based on liquid polymer and polythioether. This is a corrosion inhibiting, waterproofing and gluing mastic. Its viscosity is such that it can be applied with a roller. It polymerizes quickly at ambient temperature and can wait for about 15 minutes before pressurization. This mastic is particularly suitable for the process since the skin can be quickly brought into contact with all parts of the framework and a well ordered and generalized pressurization can be applied, in a single operation.

In the embodiment shown in the figures, the part of the framework 10 adjacent to the lower stiffener 22 is significantly less rigid than the rest of the framework. Therefore, pressurization in the closest inflatable joints 54 and 56 could induce permanent deformation in this area if no precautions were taken. This is why it is beneficial to equip the gluing cap with retractable thrust devices 60 illustrated in FIGS. 4 and 7.

In practice, these retractable thrust devices 60 comprise rigid strips 104 supported by levers 106. Levers 106 are hinged through pins 108 on the longitudinal edge of the cap 48 closest to the lower stiffener 22 when the cap is brought into the active position.

FIG. 4 illustrates the thrust devices 60 in their retracted state. The levers on which the rigid strips 104 are fitted are then pivoted outside cap 48 in order to completely free the recess 49 in which the framework 10 carrying the upper skin 12 will be placed.

Figure 7:
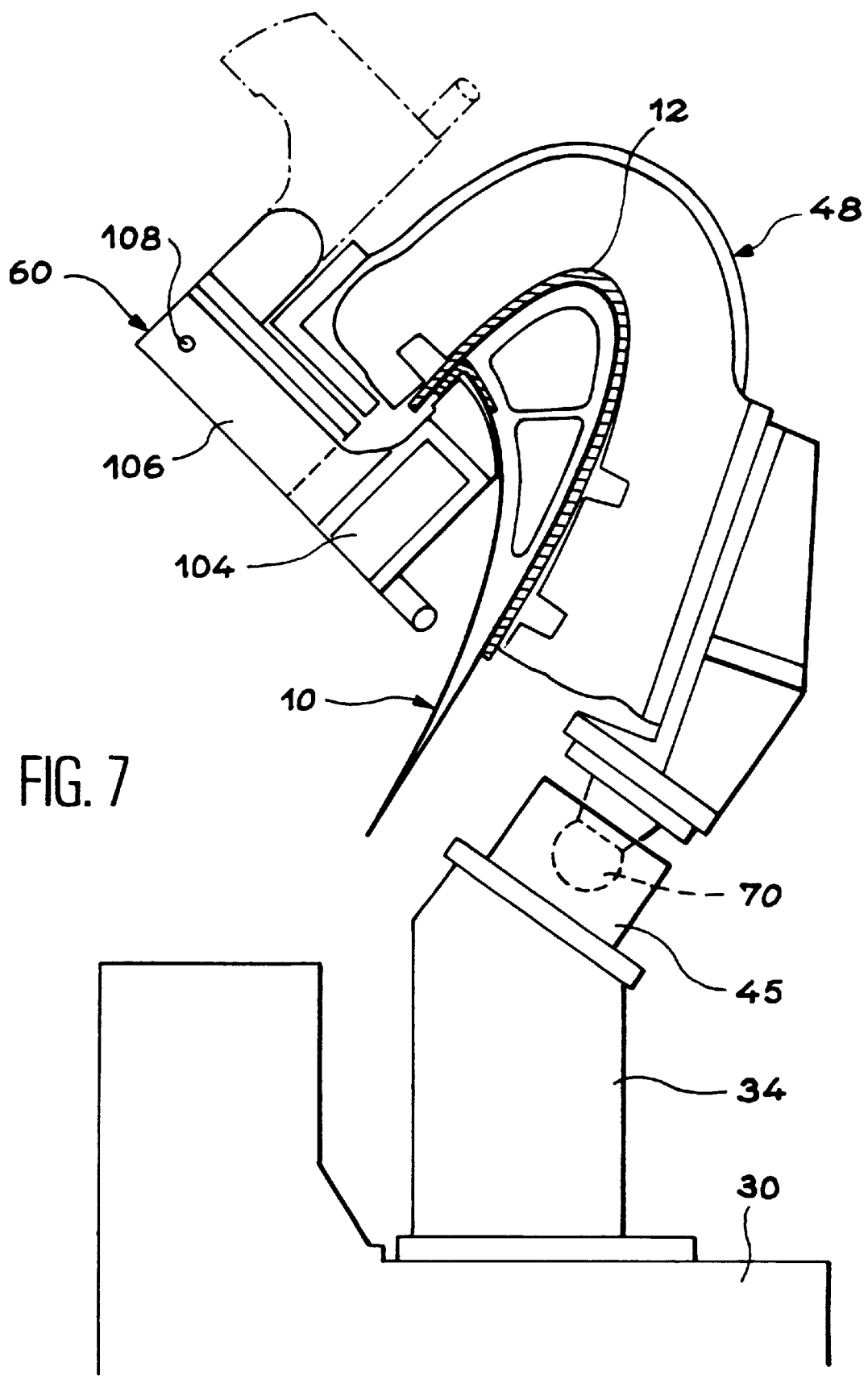
FIG. 7 is a sectional view of the gluing cap, showing in particular the retractable thrust devices fitted on it.

When the cap 48 has been brought into its active gluing position, the levers 106 supporting the rigid strips 104 are pivoted such that they come into position behind the lower stiffener 22 (FIG. 7). The strips 104 then form a rigid support surface for this stiffener, opposing any permanent deformation of the perforated structure 10 in this overhanging area when the inflatable joints 54 and 56 are pressurized.

If the cold gluing operation is to be carried out under the best possible conditions, it is desirable that the gluing cap 48 should be perfectly positioned with respect to the rigid chassis 28.

To enable positioning of the cap 48, two guide supports 62 are mounted on the frame 30 (FIG. 4), when the chassis 28 on which parts 10 and 12 to be assembled are supported, has reached the gluing station. More precisely, the guide supports 62 are fitted on the beam forming the frame 30 beyond the end supports 40. Each of the guide supports 62 is equipped with an inclined slide 64, the lower end of which is closed and the top end of which is open and gradually tapered outwards.

The two slides 64 form guide means that cooperate with complementary guide means fitted on the gluing cap 48. These complementary guide means are mounted on vertical plates 66, closing the cap 48 at each of its longitudinal ends. In the embodiment illustrated particularly in FIGS. 4 and 8, the complementary guide means supported by the cap 48 are materialized by three aligned wheels 68 mounted on the outer face of each plate 66.

Figure 5:
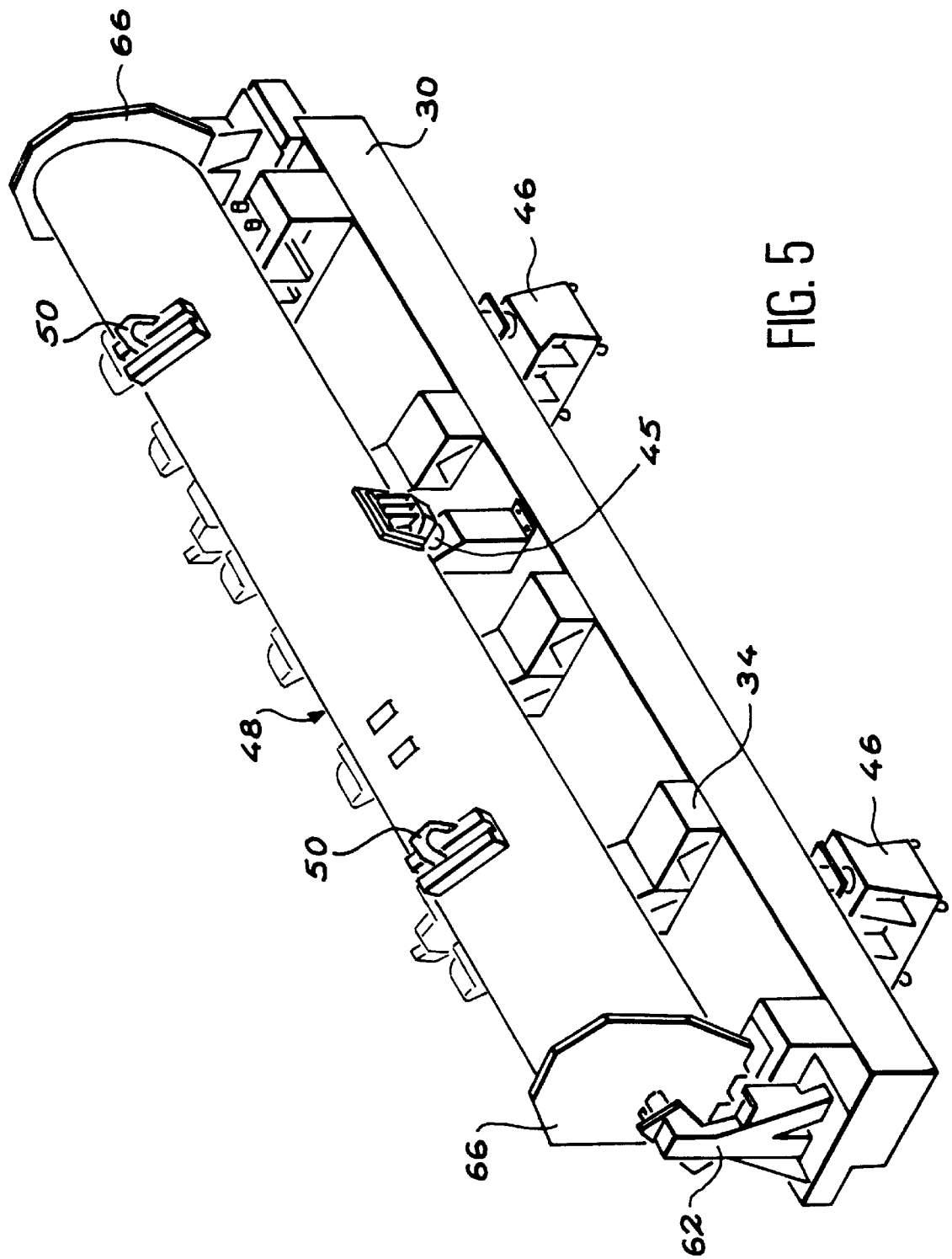
FIG. 5 is a perspective view showing the gluing cap clamped to the chassis, to do the gluing.

When the cap 48 is suspended by its hooks 50, the two rows of aligned wheels 68 are laid out essentially vertically. When the cap 48 is lowered towards parts 10 and 12 to be glued, each of the wheels 68 enters these guide slides 64 successively. This entry is facilitated by the tapered shape of the open upper end of the slides. As the wheels 68 enter into the slides 64, the gluing cap 48 tilts to move into the orientation defined by the slides 64, as illustrated in FIGS. 5 and 6. The cap is then positioned perfectly and oriented with respect to the parts to be assembled, that it covers as shown in FIG. 6.

During gluing, the ends of the cap 48 are clamped onto the guide slides 64 using clamping handles 65 (FIG. 4) fitted on the slides.

Allowing for the length of the gluing cap 48, and in order to prevent any distortion of the cap between its ends, the guide means formed by the slides 64 and the wheels 68 are complemented by one or several intermediate support and clamping points.

These support points comprise one or two spheres 70 (FIG. 7) mounted on the edge of the gluing cap 48 located on the same side of the framework 10 as the trailing edge 26. The sphere(s) 70 automatically come(s) into position in the receptacle(s) 45 (FIG. 2) provided for it (them) on the rigid chassis 28. This layout controls precise longitudinal positioning of the cap with respect to the chassis and, as shown above, prevents any deflection of the cap between its ends. Clamping means (not shown) are preferably provided on the receptacles 45 in order to fix them in position on the spheres 70 during gluing.

On its edge opposite to the edge supporting the sphere(s) 70, the gluing cap 48 is equipped with one or two devises 72 (FIG. 6). Each clevis 72 is used to fix the cap 48 in a rigid manner to the corresponding clevis 47 (FIG. 4) provided on the chassis 28 when the cap covers the parts to be assembled. This connection is made by clamping means composed of one or two anchor stands 74, one of which is partially illustrated in FIG. 6. The upper end of each anchor stand 74 is rigidly connected to a clevis 72 by a pin 76 at its upper end. Similarly, the lower end of each stand 74 is rigidly connected to a clevis 47 (FIG. 4) fixed on the chassis 28 using a broach or any other equivalent clamping device.

In order to ensure that the upper skin 12 is satisfactorily cold glued to the perforated framework 10, these two parts must be perfectly positioned with respect to each other. This is done by equipping the rigid chassis 28 with skin 12 positioning means and fitting means of gripping this skin on the cap 48 in order to guarantee that this positioning is unchanged when glue has been applied to the parts.

Each of the two end supports 40 is fitted with a positioning pin 78 (FIG. 3), and a tab 80 in which a hole 82 is drilled is provided at each longitudinal end of the skin 12, in order to position the upper skin 12 on the rigid chassis 28. More precisely, the pins 78 project beyond the outer envelope of the perforated framework 10, to penetrate into the holes 82 with practically no play when the skin 12 is perfectly positioned on the framework 10. The tabs 80 will be eliminated in a later step of the manufacture of the leading edge.

Figure 8:
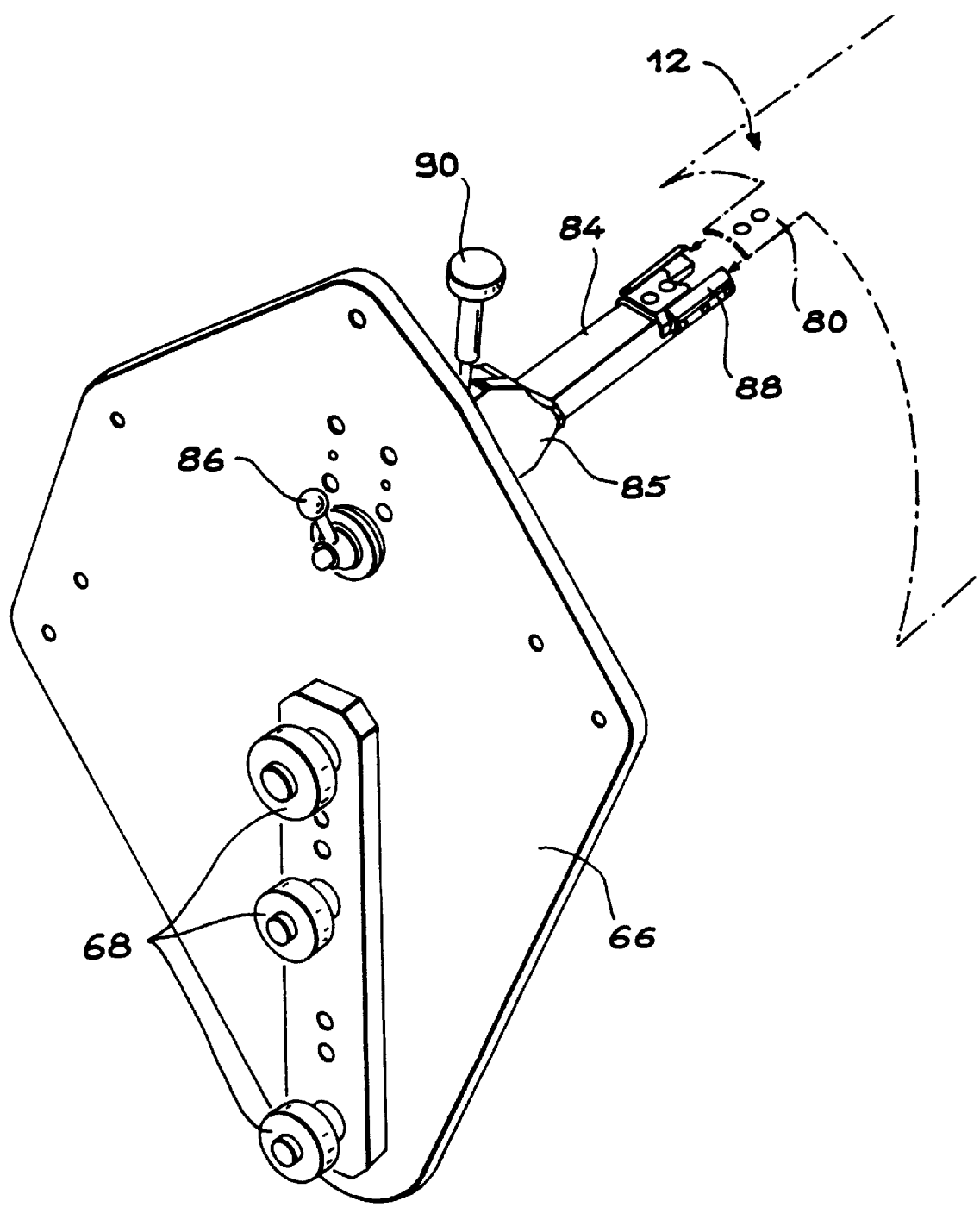
FIG. 8 is a perspective view showing one of the end plates of the gluing cap, and the guide means and the gripping means for the panel supported by this plate.

As shown in FIG. 8, the gripping means installed on the gluing cap 48 comprise two slides 84 mounted free to slide in the support blocks 85 fixed on the inside face of each end plate 66. The slides 84 move along a line parallel to the longitudinal axis of the cap when an operator activates a handle 86 located outside the plate 66. Each end of each slide 84 is fitted with a tab guide 88 facing the inside of the cap, into which the corresponding tab 80 in the upper skin 12 fits. A latch 90 fixes each slide 84 in its gripping position.

When the cap 48 is in the high inactive position, the slides 84 are retracted into the support blocks 85. When the cap 48 is brought above parts 10 and 12 to cover them as shown in FIG. 6, each of the tab guides 88 is aligned with the tabs 80 formed on the upper skin 12. The slides 86 are then maneuvered to engage each tab guide 88 on the corresponding tab 80, in order to grip the upper skin 12. After locking in this position using latch 90, lifting the cap 48 upwards removes the upper skin 12. The position occupied by the skin is then perfectly determined inside the cap 48, since the cap and the skin 12 were perfectly positioned with respect to the chassis 28 at the time of gripping.

Figure 9:
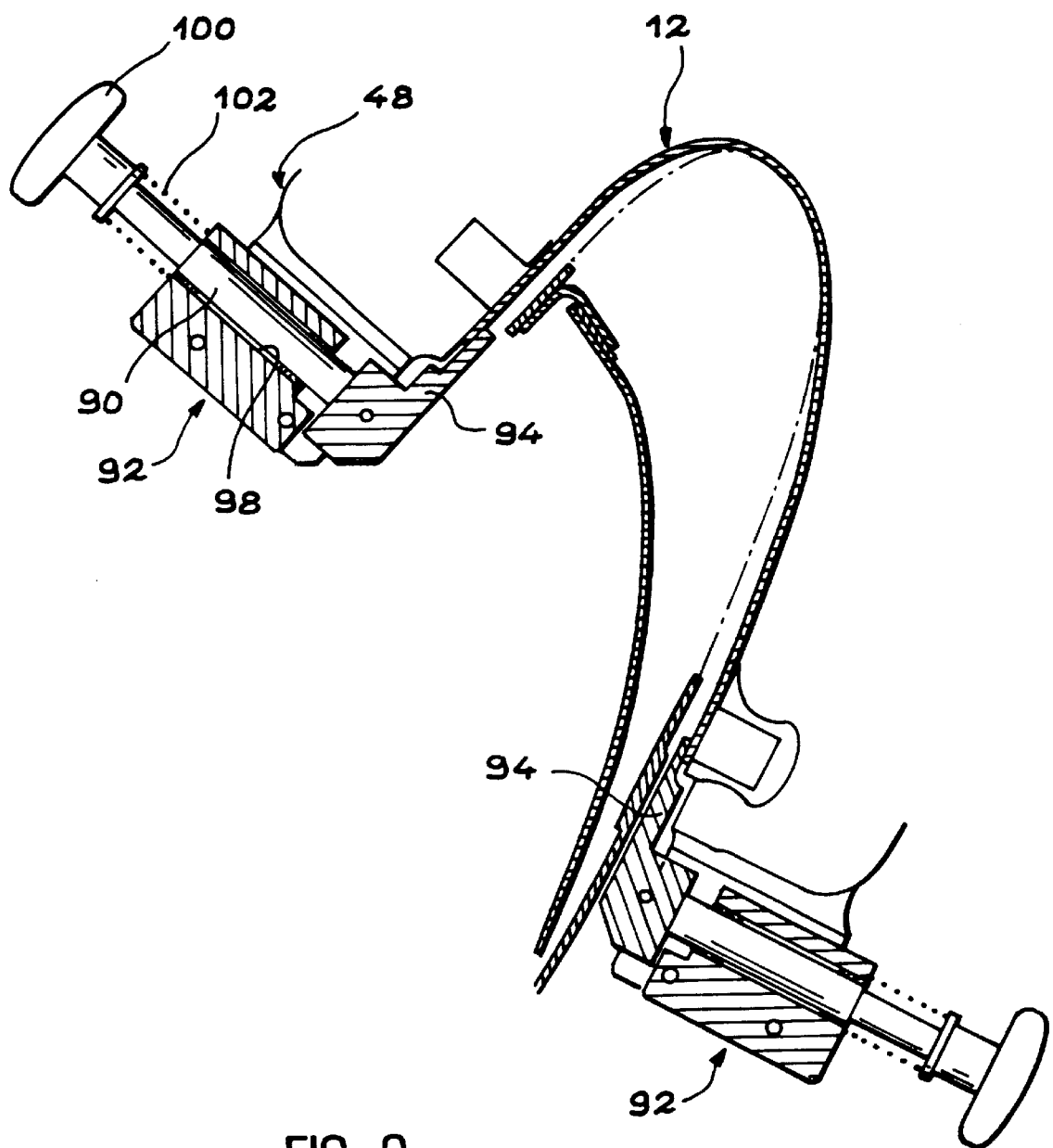
FIG. 9 is a partial sectional view, in particular showing means of gripping the panel fitted on the gluing cap.

As illustrated in FIG. 9, the gluing cap 48 is advantageously equipped with clamping means 92 along its longitudinal edges. The purpose of these clamping means 92 is to keep the longitudinal edges of the upper skin 12 pressed against the inner surface of the cap 48 when the skin is installed in the cap using the gripping means described above. More precisely, the clamping means 92 make it possible to apply the skin 12 onto the perforated framework 10 under the best possible conditions after glue has been applied to this structure.

In the embodiment illustrated as an example in FIG. 9, the clamping means 92 comprise a number of thrust clamps 94 fixed to the ends of rods 96 that can slide and rotate in the bores 98 passing through the supports attached to the cap. At the end opposite the clamp 94, each of the rods 96 is fitted with an actuator button 100. Furthermore, a compression spring 102 is inserted between the button 100 and the outer surface facing the support linked to cap 48.

In its rest position (not shown), the clamps 94 pivot towards the outside of the recess 49 provided in cap 48 so that the parts to be assembled can enter. When the cap 48 covers the parts, particularly to grip the upper skin 12, an operator presses the buttons 100 and rotates them by 180° in order to move the clamps 94 to face the longitudinal edges of the skin 12. As soon as a button 100 is released, the spring 102 forces the clamp 94 into the position illustrated in FIG. 8, in which the edge of the skin is clamped in contact with the inner surface of the cap 48.

We will now describe how to use the installation that has just been described.

In the first step, the chassis 28 supporting the perforated framework 10 is brought to the gluing station. The guide supports 62 are then mounted on the chassis 30 as shown in particular in FIGS. 4 and 5. Operators then place the upper skin 12 on the framework 10, without applying any glue. As explained above, placement is complete when each of the holes 82 is in place on the pin 78 provided to position it (FIG. 3).

The gluing cap 48 adapted to the perforated framework 10 mounted on chassis 28 is then brought above the chassis 28 and is gradually lowered until the wheels 68 have almost entirely entered the guide slides 64. A check is then carried out by locking the cap 48 onto the chassis 28 using the clamping handles 65 and/or the anchor stands 74 connecting the devises 72 and 47 and then by pressurizing the installation without glue in order to check contact of the skin on the framework. The pressure is then released and the cap is unlocked. The operators then activate the two handles 86 so that the skin 12 is gripped by the cap. They lock the slides 84 into position using latches 90.

The cap 48 is then raised and glue is applied on surfaces of the framework 10 that will come into contact with the upper skin 12. These surfaces are cleaned beforehand, and protective strips are placed on surfaces that are not to be glued.

When gluing is finished, the cap 48 is lowered once again. The longitudinal edges of the skin 12 are firstly separated by the use of gripping means 92, as illustrated in FIG. 9.

When the cap 48 covers the perforated framework 10, the clamping stand(s) 74 is (are) put into position (FIG. 6), the sphere(s) 70 (FIG. 7) is (are) clamped and the clamping handles 65 (FIG. 4) are activated. The clamping means 92 are then released. The cold gluing operation itself is then applied by progressive inflation of the inflatable joints 54 and 56 in the order described above. The maximum pressure applied on the parts is about 2 bars.

When the time necessary for cold polymerization of the gluing mastic is complete (for example about 2 hours), the inflatable joints 54 and 56 are deflated and the various clamping devices are released.

The cap 48 is then raised once again to release the chassis 28 supporting parts 10 and 12 that are then pre-assembled.

The chassis 28 is then taken to the next station, where the skin 12 is permanently attached to the perforated structure 10. This attachment is made by directly drilling parts to the diameter necessary for the mechanical attachment means used. These attachment means, which may be composed of any appropriate attachment means such as rivets, bolts, etc., are then put into place.

The invention reduces the time necessary for preassembly using traditional temporary fastening techniques by a factor of about 10.

Naturally and as already mentioned, the invention is not limited to the manufacture of the leading edge of an aircraft wing, but is more generally applicable to the assembly of any flexible panel onto an elastically deformable structure that is stiffer than the panel.

Furthermore, many modifications may be made to the installation described without going outside the scope of the invention. Thus, the number and distribution of linear and single-point joints used on the cap depend on the type of parts from which the assembly is made. Linear joints are positioned adjacent to the strongest areas of the framework. Single-point joints are usually laid out in lines parallel to the linear joints and, depending on the case, may make up one or several lines between two consecutive linear joints. Conversely, two linear joints may also be placed side by side without any single-point joints.

What is claimed is:

1. Process for assembly of a flexible panel on an open, elastically deformable structure that is stiffer than the panel, said process comprising a pre-assembly step of bonding the panel onto the structure, followed by an attachment step of attaching the panel onto the structure by means of mechanical attachment devices, wherein the pre-assembly is done by cold gluing;

wherein the cold gluing is done by assembling the structure onto a rigid chassis, by positioning the panel on the structure with insertion of glue and pressing the panel into contact with the structure;

wherein the structure comprises a perforated framework, in which the panel is locally pressed into contact with this framework, mainly in unperforated parts of the framework;

wherein the perforated framework comprises essentially C-shaped ribs and devices forming stiffeners connecting these ribs together, in which the panel is pressed into contact with these devices over most of their length, and the panel is also pressed into contact with these ribs at local positions between devices forming stiffeners;

wherein the radius of curvature of the ribs is variable, with a minimum value in the central region, the panel is also pressed into contact with the central regions of the ribs over most of the length of the perforated framework;

wherein the panel is progressively pressed into contact with the perforated framework, firstly by bringing the panels into contact with the said central regions of the ribs and then progressively working towards the rib end regions.

2. Process for assembly of a flexible panel on an open, elastically deformable structure that is stiffer than the panel, said process comprising a pre-assembly step of bonding the panel onto the structure, followed by an attachment step of attaching the panel onto the structure by means of mechanical attachment devices, wherein the pre-assembly is done by cold gluing;

wherein the cold gluing is done by assembling the structure onto a rigid chassis, by positioning the panel on the structure with insertion of glue and pressing the panel into contact with the structure;

wherein the structure comprises a perforated framework, in which the panel is locally pressed into contact with this framework, mainly in unperforated parts of the framework;

wherein the panel is pressed into contact with the perforated framework by means of inflatable joints installed in a rigid gluing cap;

wherein the panel is initially put into position on the chassis supporting the perforated framework without inserting glue, the cap is then moved into the gluing position to hold the panel in position, the cap supporting the panel is moved away from the framework, the glue is applied, and the cap is brought back into the gluing position to press the panel into contact with the framework.

3. Process according to claim 1, in which the panel is pressed into contact with the perforated framework by means of inflatable joints installed in a rigid gluing cap.

4. Process according to claim 3 or 2, in which the cap is moved into the gluing position by guiding the cap onto the chassis supporting the structure.

5. Process according to claim 3 or 2, in which the cap is clamped onto the chassis supporting the framework before pressing the panel into contact with the framework.

6. Process as in any of claims 1 through 2 applied to the assembly of a skin forming the flexible panel on a framework forming the structure, when an aircraft leading edge is being manufactured.

7. Process for assembly of a flexible panel on an open, elastically deformable structure that is stiffer than the panel, said process comprising a pre-assembly step of bonding the panel onto the structure, followed by an attachment step of attaching the panel onto the structure by means of mechanical attachment devices, wherein the pre-assembly is done by cold gluing;

wherein the cold gluing is done by assembling the structure onto a rigid chassis, by positioning the panel on the structure with insertion of glue and pressing the panel into contact with the structure;

wherein the structure comprises a perforated framework, in which the panel is locally pressed into contact with this framework, mainly in unperforated parts of the framework;

wherein the panel is pressed into contact with the perforated framework by means of inflatable joints installed in a rigid gluing cap;

wherein at least one edge is kept overhanging the perforated frame before the panel is locally pressed into contact with perforated framework, using thrust devices fitted on the gluing cap.

8. Process for assembly of a flexible panel on an open, elastically deformable structure that is stiffer than the panel, said process comprising a pre-assembly step of bonding the panel onto the structure, followed by an attachment step of attaching the panel onto the structure by means of mechanical attachment devices, wherein the pre-assembly is done by cold gluing;

wherein the cold gluing is done by assembling the structure onto a rigid chassis, by positioning the panel on the structure with insertion of glue and pressing the panel into contact with the structure;

wherein the structure is installed on the rigid chassis at an assembly station for this structure by assembling its component elements on an assembly template fixed to a frame, the assembly template and the frame forming the rigid chassis, and in which the rigid chassis supporting the structure is transferred to a gluing station, where the panel is glued to the structure.

9. Installation for pre-assembly of a flexible panel on an open, elastically deformable structure with greater stiffness than the panel, before the panel is attached to the structure using mechanical attachment devices, the said installation comprising cold gluing means;
   wherein the cold gluing means comprise:
      a rigid chassis, on which the said open structure is fixed;
      means of positioning the panel with respect to the rigid chassis; and
      means of pressing the panel into contact with the open structure;
   wherein the structure comprises a perforated framework, in which the means of applying pressure to the panel comprise local pressurization means wherein the local pressurization means apply pressure to the faces of the unperforated regions of the structure;
   wherein the local pressurization means comprise inflatable joints fitted in a rigid gluing cap;
   wherein the local pressurization means comprise means of sequentially pressurizing the inflatable joints beginning with the joints facing a central region of the panel and finishing with joints facing end regions of the panel.

10. Installation according to claim 9, in which the inflatable joints comprise linear joints and local joints.

11. Installation according to claim 9, in which the gluing cap cooperates with the chassis supporting the structure by guide means.

12. Installation according to claim 9, in which the gluing cap can be connected to the chassis supporting the structure by clamping means.

13. Installation for pre-assembly of a flexible panel on an open, elastically deformable structure with greater stiffness than the panel, before the panel is attached to the structure using mechanical attachment devices, the said installation comprising cold gluing means;
   wherein the cold gluing means comprise:
      a rigid chassis, on which the said open structure is fixed;
      means of positioning the panel with respect to the rigid chassis; and
      means of pressing the panel into contact with the open structure;
   wherein the structure comprises a perforated framework, in which the means of applying pressure to the panel comprise local pressurization means wherein the local pressurization means apply pressure to the faces of the unperforated regions of the structure;
   wherein the local pressurization means comprise inflatable joints fitted in a rigid gluing cap;
   wherein the gluing cap comprises at least one retractable thrust device that can be placed behind an overhanging edge of the structure.

14. Installation for pre-assembly of a flexible panel on an open, elastically deformable structure with greater stiffness than the panel, before the panel is attached to the structure using mechanical attachment devices, the said installation comprising cold gluing means;
   wherein the cold gluing means comprise:
      a rigid chassis, on which the said open structure is fixed;
      means of positioning the panel with respect to the rigid chassis; and
      means of pressing the panel into contact with the open structure;
   wherein the rigid chassis comprises an assembly template fixed to a frame that can be moved between a structure assembly station, a gluing station at which the panel is glued to the structure, and an attachment station in which the panel is attached to the structure.

* * * * *